(12) United States Patent
Kobayashi

(10) Patent No.: US 7,174,558 B2
(45) Date of Patent: Feb. 6, 2007

(54) MEMORY DEVICE

(75) Inventor: Hiroki Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 238 days.

(21) Appl. No.: 10/327,746

(22) Filed: Dec. 23, 2002

(65) Prior Publication Data
US 2003/0128650 A1  Jul. 10, 2003

(30) Foreign Application Priority Data
Dec. 28, 2001  (JP)  ............ 2001-399986

(51) Int. Cl.
G11B 21/02  (2006.01)
G11B 21/22  (2006.01)

(52) U.S. Cl. .................. 720/673; 360/256.4

(58) Field of Classification Search .......... 720/673, 720/659, 663, 676, 680; 360/256.4
See application file for complete search history.

(56) References Cited

U.S. PATENT DOCUMENTS

| | | | |
|---|---|---|---|
| 5,189,576 A | | 2/1993 | Morehouse et al. |
| 5,877,922 A | * | 3/1999 | Boutaghou ............ 360/256.5 |
| 5,995,467 A | * | 11/1999 | Ohyama et al. ............ 369/71 |
| 6,185,074 B1 | * | 2/2001 | Wang et al. ............ 360/256.4 |
| 6,381,102 B1 | * | 4/2002 | Strom et al. ............ 360/256 |
| 6,512,728 B1 | | 1/2003 | Nasu et al. |
| 6,542,336 B2 | * | 4/2003 | Ethirajan ............ 360/256.4 |
| 6,757,139 B2 | * | 6/2004 | Miyamoto ............ 360/256.4 |
| 6,826,138 B2 | * | 11/2004 | Abrahamson et al. ... 369/53.25 |

FOREIGN PATENT DOCUMENTS

| | | | |
|---|---|---|---|
| JP | 63087673 A | * | 4/1988 |
| JP | 02292781 A | * | 12/1990 |
| JP | 05062228 A | * | 3/1993 |
| JP | 05-282692 | | 10/1993 |
| JP | 05-303844 | | 11/1993 |
| JP | 06-503439 | | 4/1994 |
| JP | 08-096530 | | 4/1996 |
| JP | 08-129763 | | 5/1996 |
| JP | 10049895 A | * | 2/1998 |
| JP | 10064105 A | * | 3/1998 |
| JP | 11126445 A | * | 5/1999 |
| JP | 11-353826 | | 12/1999 |
| JP | 2000-276873 | | 10/2000 |
| JP | 2000-285583 | | 10/2000 |
| JP | 2001-344780 | | 12/2001 |

* cited by examiner

Primary Examiner—William J Klimowicz
(74) Attorney, Agent, or Firm—Greer, Burns & Crain, Ltd.

(57) ABSTRACT

A memory device for recording, playback, and erasure of data through the application of an optical head along a memory medium includes a head carriage and a carriage lock. The head carriage moves the optical head along the surface of the memory medium, and the carriage lock prevents movement of the head carriage in response to a specific shock force. The carriage lock utilizes mechanical energy received from the shock force itself to prevent the movement of the head carriage.

13 Claims, 7 Drawing Sheets

MEMORY DEVICE

BACKGROUND OF THE INVENTION

1. Field of the Invention

The present invention relates generally to memory devices, and more particularly to memory devices having shock force protection.

2. Description of the Related Art

Previously, an optical head carriage that uses a linear motor system has been set up to move in a completely free manner along the top of a guide rail, and for this reason, there has been cause for concern with regard to damage that may occur to the lens actuator and carriage in cases where a shock is received during transport.

In order to make improvements regarding this point, a carriage lock mechanism has been installed for the purpose of operating a stopper which a portion of the carriage would strike against when a disk is not installed. Specifically, Japanese publication patent numbers H08-096530 and H05-282692 call for the use of an electric motor or electromagnet to move the carriage lock immediately before non-access or cut-off of electrical power occurs, the carriage lock being cancelled during operation startup.

However, due to designs that result in smaller and lighter devices, there is not enough space to allow for the installation of these kinds of motors and electromagnets. Since there is a need to operate the carriage as well as the locking mechanism, it is difficult to maintain enough electricity in the case of low-consumption devices and battery powered devices, particularly for shut down purposes.

Furthermore, Japanese publication patent numbers H05-303844 and 2000-276873 call for a mechanical link between the carriage lock and the disk loading mechanism or the eject mechanism. The link to the disk loading operation cancels the carriage lock, and the link to the disk ejection operation calls for a carriage locking mechanism to operate the carriage lock.

However, due to competitive pressure to reduce cost and the number of parts that has been seen in the industry recently, there is a trend toward eliminating the carriage lock mechanism. At the very least, though, there is a need to prevent contact between the objective lens and the memory medium, and as called for in Japanese patent application number 2000-161844, a regulating member 64a in the form of a mechanical stopper is installed for the purpose of regulating contact between the memory medium and the objective lens, which is supported by a leaf spring.

Recently, 3.5-inch magneto optical disks have achieved a memory capacity of up to 2.3 GB, and with their high-density recording capability, there has been a need for smaller recording marks as well as the formation of recording pits. For this reason, there is a trend toward a smaller laser light beam diameter as well as high NA (numerical aperture), making it necessary to have a closer distance between the optical disk and the objective lens.

However, if the gap (space) between the objective lens and the medium becomes smaller than the amount of surface deflection of the memory medium, a problem will arise in that it will become impossible from the standpoint of space to use the type of mechanical stopper indicated as the regulating member 64a in Japanese patent application number 2000-161844. Furthermore, in the case of the carriage lock mechanisms noted in Japanese publication patent numbers H05-303844 and 2000-276873, the carriage lock operation is cancelled while a disk is loaded, such that when a vibration occurs due to the portability of the optical disk device, or when the optical disk device is dropped while an optical disk is inserted within the device, it becomes impossible to lock the carriage in its specified position. This situation poses the problem of damage not only to the carriage and lens actuator, but also to the disk.

Accordingly, one object of this invention is to present a carriage lock mechanism as well as a memory device that uses such a mechanism, wherein it is possible to prevent the carriage from shifting from its specified position, regardless of whether or not a memory medium is loaded, as a result of the capability to provide a relevant response to the occurrence of shock.

SUMMARY OF THE INVENTION

In keeping with one aspect of this invention, a memory device designed for recording, playback, and erasure of data through the application of an optical head along a memory medium includes the following: a head carriage that is used to move the aforementioned optical head along the surface of the aforementioned memory medium; and a carriage lock that is used to prevent movement of the aforementioned head carriage in response to a specific shock force. Preferably, the carriage lock is actuated by the shock itself.

For example, the carriage lock can rotate between its locked and unlocked positions, such that when a shock force is received, a rotational force causes the carriage lock to rotate from its unlocked position to its locked position.

In one embodiment, the carriage lock can have a first arm that contains an engagement mechanism used to engage the carriage lock with the head carriage when in the locked position; a second arm that is linked to the first arm and is used to move the first arm between the locked and unlocked positions; a balance member that is attached to the second arm and helps the second arm achieve a rotational force when the shock force is received; and a return member that allows the second arm to return to the unlocked position from the locked position once the aforementioned shock force subsides.

In one embodiment, the aforementioned return member can be made of a spring member that biases the first or second arm in the unlocked direction. In another embodiment, a magnet or magnetic material magnetically pulls the first or second arm to the unlocked direction.

The balance member can also have a weight such that the carriage lock engages the locked position when a shock force is received which causes the balance member to move at an acceleration which measures 9.8 m/s$^2$ (gravitational acceleration of 1 G) or greater with respect to the body of the memory device.

If desired, the aforementioned head carriage can be supported by two guide rails and can have a coil support for supporting a drive coil, such that the head carriage is prevented from shifting when the carriage lock engagement mechanism makes direct contact with the coil support.

Another option is to equip the end of the movable area of the head carriage with a protection cover that protects the head. The head carriage, or the end of the moveable area belonging to the head carriage, can also be equipped with a shock absorption member that is used to alleviate the shock against the head carriage.

If desired, the head carriage can be equipped with a magnet or magnetic material that supports the head carriage at the end of its moveable area.

BRIEF DESCRIPTION OF THE DRAWINGS

FIG. 2b is an expanded view of part of the base assembly of FIG. 2a.

FIG. 6b is an expanded view of part of the base assembly of FIG. 6a.

DETAILED DESCRIPTION OF THE DRAWINGS

Figure 1:
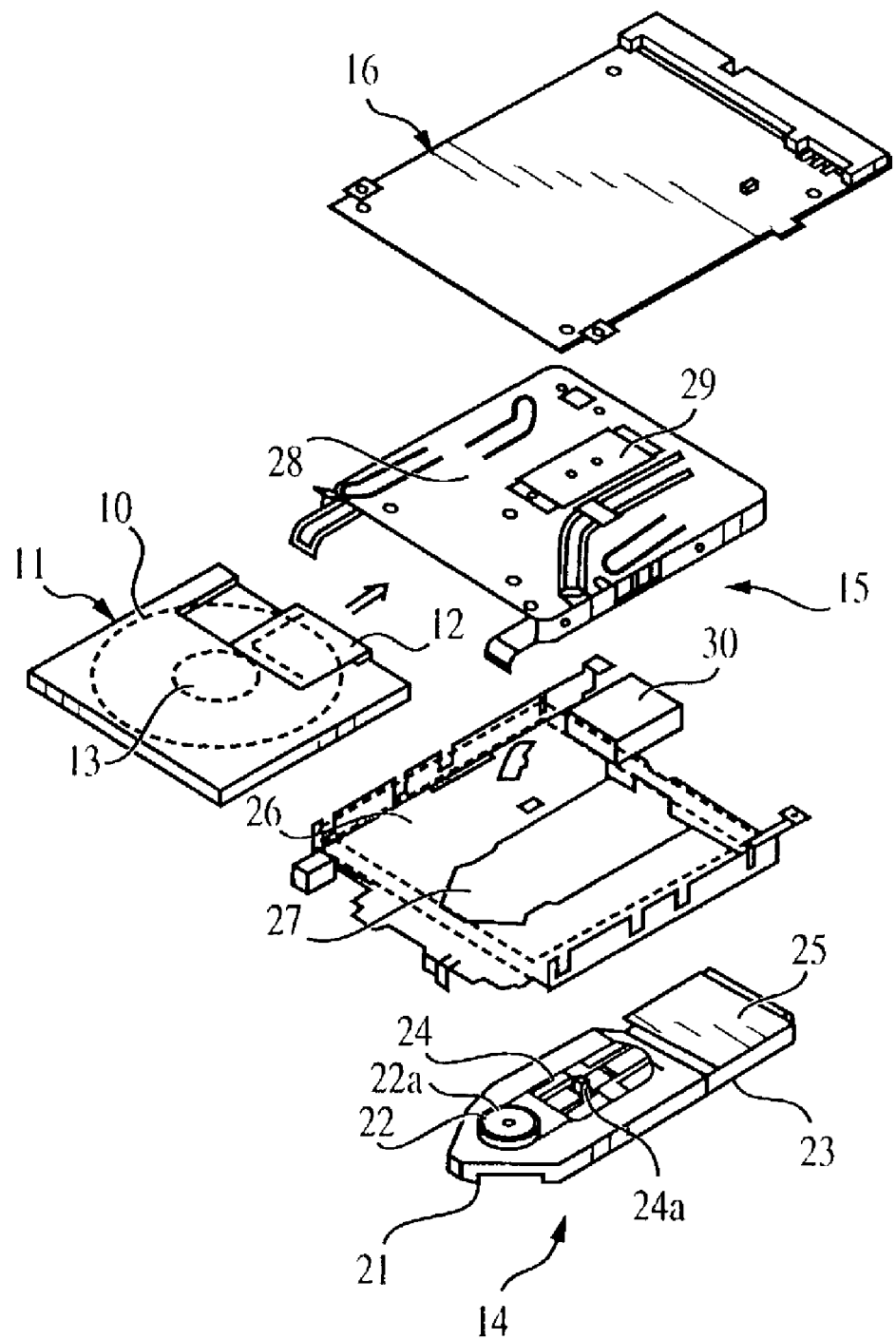
FIG. 1 is a perspective view of a disassembled magneto optical disk device.

FIG. 1 is an oblique view of a disassembled magneto optical disk device 1 used as a memory device according to the present invention. A magneto optical disk 10 is stored within a magneto optical disk cartridge 11. The magneto optical disk device 1 is constructed such that a magneto optical disk can be inserted and removed, and recording, playback, and erasure of data are conducted with respect to the magneto optical disk 10. In addition to recording/playback of data, the magneto optical disk device 1 can also be used as a testing device or a medium processing device for magneto optical disks once connected to a dedicated host.

The magneto optical disk device 1 includes a base assembly 14, a load assembly 15, and a circuit substrate 16. The base assembly 14 is equipped with a spindle motor 22 on a base 21, a stationary optical system 23, a lens carriage 24 which also functions as a moving optical system 24, and a head circuit substrate 25. A turntable 22a of the spindle motor 22 engages with a magnetic material hub 13 of the magneto optical disk 10 when the magneto optical disk 10 is in a specified loaded position, which in turn causes the magneto optical disk 10 to rotate, as described below.

The stationary optical system 23, which typically contains a laser diode, outputs a laser beam in response to a drive signal sent from the head circuit substrate 25. The output laser beam is sent through a window (not shown) of the stationary optical system 23 and into a window (not shown) of the lens carriage 24. The output laser beam from the stationary optical system 23 is preferably sent in an abbreviated parallel direction with respect to a plane of the magneto optical disk 10, and shifted to an abbreviated vertical direction by a standing mirror (not shown), so that the laser light beam may be irradiated onto the magneto optical disk 10.

Figure 2A:
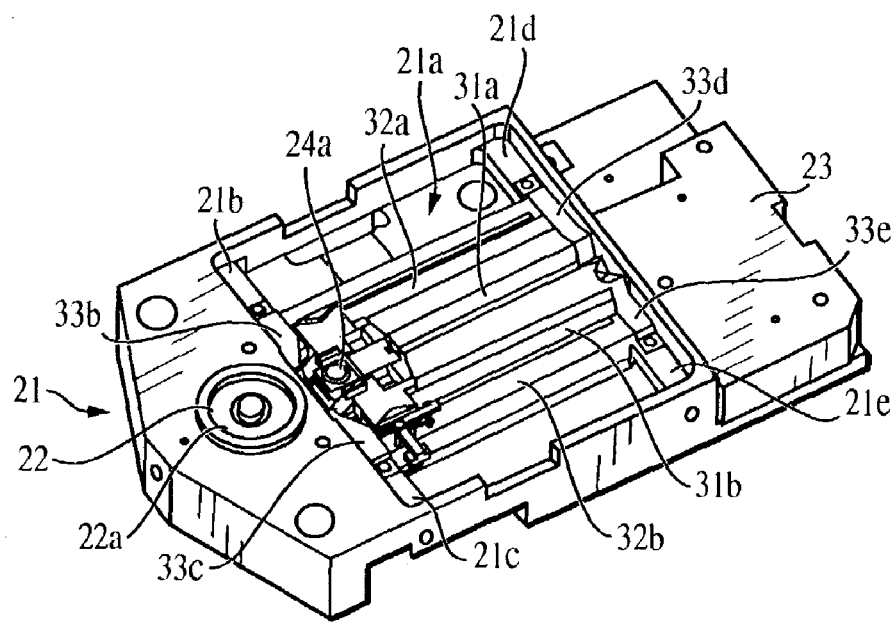
FIG. 2a is a perspective view of the base assembly.
Figure 2B:
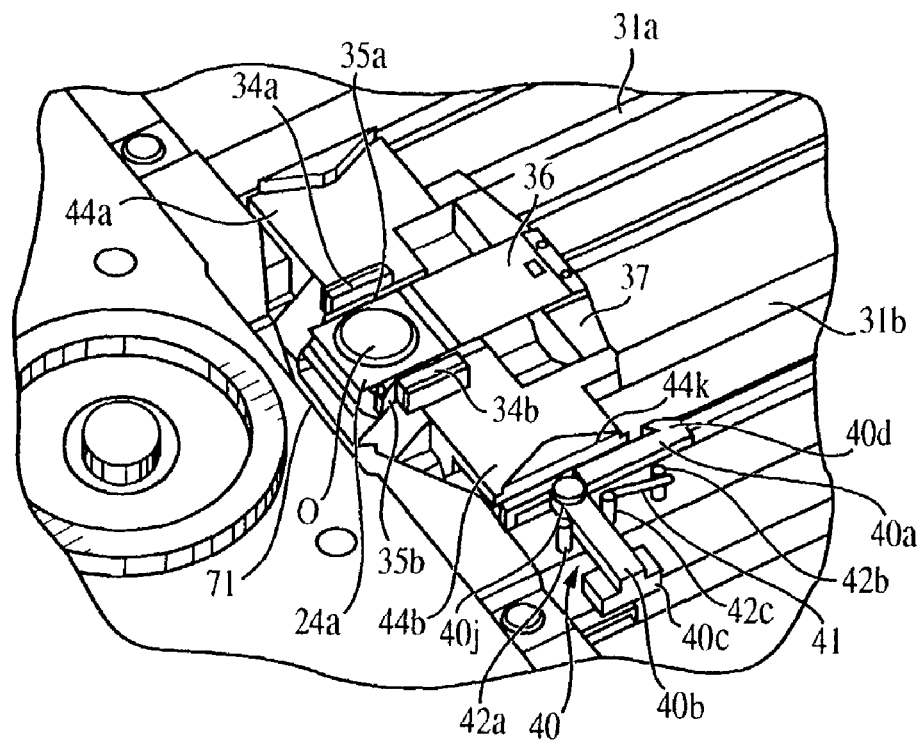

An objective lens O is supported by the lens holder 24a (see FIGS. 2a, 2b). Focusing control is performed to swing the lens with respect to the disk 10, through the operation of a lens actuator of a type known in the art, so that the light beam focuses on recording/playback portions of the magneto optical disk 10. The objective lens O also undergoes tracking control to enable the light beam to scan over specified tracks formed on the magneto optical disk 10. Seek control is also performed to enable the light beam to be moved in a radial direction of the magneto optical disk 10 to a position on a specified track. In this embodiment of the present invention, a voice coil motor is preferably controlled by an actuator which serves as both a seek actuator and a tracking actuator.

The light beam irradiated onto the magneto optical disk 10 from the carriage 24 reflects off the magneto optical disk 10 and then returns to the carriage 24 as a reflected light beam. The carriage 24 then delivers the reflected light beam to the stationary optical system 23 as a returned light beam. The stationary optical system 23 then detects a magneto optical signal, a focusing error signal, and a tracking error signal based on the returned light beam from the carriage 24. The returned light beam is preferably delivered to a signal detector, a focusing detector, and a tracking error detector (not shown) installed within the stationary optical system 23, where the returned light beam is then converted to respective electrical signals. The converted electrical signals are then delivered to the head circuit substrate 25. The head circuit substrate 25 amplifies the converted electrical signals and delivers them to the main circuit substrate 16.

Referring now to the base assembly 14, the spindle motor 22 and lens carriage 24 are engaged in an opening 27 of the load/eject assembly 15 and combined with a load/eject assembly unit 12 of the disk cartridge 11. When the load/eject assembly 15 is guided into a specified load position of the magneto optical disk cartridge 11, the assembly 15 ejects the magneto optical disk cartridge 11 from a loaded position to outside of the device 1. A load base 26 is constructed with a load/eject mechanism (not shown) mounted along with a cartridge holder 28 and an eject motor 30.

The load base 26 supports the cartridge holder 28 via the load/eject mechanism, to enable up and down movement of the cartridge holder 28. When the magneto optical disk cartridge 11 is loaded in the cartridge holder 28, the cartridge holder 28 drops toward the load base 26, and a magnetic chucking operation brings the magnetic hub 13 of the magneto optical disk 10 to the turntable 22a of the spindle motor 22. When the magneto optical disk cartridge 11 is ejected, the cartridge holder 28 lifts, and the magnetic hub 13 of the magneto optical disk 10 is pulled away from the turntable 22a of the spindle motor 22.

The cartridge holder 28 is preferably equipped with a bias magnetic field application device 29, as well as a cartridge support mechanism and a shutter opening and closing mechanism (not shown). The cartridge support mechanism is preferably designed to guide and hold the magneto optical disk cartridge 11 in place when the loading/ejection operation is conducted. The shutter opening and closing mechanism engages with the magneto optical disk cartridge 11 during loading in order to open the shutter 12 on the magneto optical disk cartridge 11, and also closes the shutter 12 during ejection. The load/eject mechanism is driven by the eject motor 30 to eject the magneto optical disk cartridge 11. The eject motor 30 is connected to the main circuit substrate 16 and is driven based on a drive signal received from the main circuit substrate 16. A control circuit (not shown) for the main circuit substrate 16 detects the eject button operation and delivers the drive signal to the eject motor 30.

The magnetic field application device 29 is located on the cartridge holder 28 in a position corresponding to a release portion of the shutter 12. The magnetic field application device 29 is preferably an electromagnet having a coil and a yoke, which are known in the art and not shown in the drawings. When the coil delivers an electrical current, a magnetic field is generated and applied to the magneto optical disk 10 via the yoke. The magnetic field application device 29 is located in a position facing the objective lens holder 24a via the magneto optical disk 10 when the magneto optical disk cartridge 11 is loaded. The magnetic field application device 29 is capable of applying a magnetic field to the magneto optical disk 10 based on instructions received from the control circuit of the main circuit substrate 16, as needed when information is to be recorded, erased, or played back.

Referring now to FIGS. 2a and 2b, a concave storage portion 21a is formed within a center of the head base 21, the base 21 preferably being made from aluminum. The storage portion 21a stores the lens carriage 24, as well as a movement mechanism (not shown) used to move the lens carriage 24 in the radial direction (transverse direction with respect to tracks) of the disk 10. The movement mechanism preferably includes a sliding bearing, a pair of guide rails, a pair of magnetic circuits, and a pair of coils.

Two guide rails 31a and 31b extend in the radial direction of the disk 10, are installed parallel to a surface of the disk 10, and are used to support the carriage 24. Both ends of each of the guide rails 31a and 31b are held in place by pressure against securing wall portions 21b, 21c, 21d, and 21e that contain steps against which the rails 31a, 31b are pressed by four respective leaf springs 33b, 33c, 33d, and 33e on opposing ends of the storage portion 21a.

Two magnetic circuits 32a and 32b are installed in a generally parallel fashion in the radial direction of the disk, and are preferably formed of yokes in which permanent magnets are attached. On opposing sides of the carriage 24, coil supports 44a and 44b are located so that two respective coils may be preferably embedded in positions facing each of the magnetic circuits 32a and 32b.

A voice coil motor (not shown) includes a magnetic circuit and coil, and when an electrical current is supplied to the coil, the carriage 24 is guided smoothly along the guide rails 31a and 31b in the radial direction of the disk 10, through the operation of sliding bearings. In this preferred embodiment, a sliding bearing is used for the sake of example. However, a ball bearing can also be used in place of the sliding bearing, as can other bearings known in the art.

The objective lens O is loaded onto the lens holder 24a. The lens holder 24a is preferably supported to enable up and down movement through the use of two parallel leaf springs 36 located above and below the lens holder 24a respectively. The parallel leaf springs 36 are attached to an installation portion 37 of the carriage 24. Magnetic circuits 34a and 34b preferably include magnets and yokes, and are located above the carriage 24 on opposing sides of the lens holder 24a. Coils 35a and 35b are installed onto opposing side surfaces of the lens holder 24a which face the magnetic circuits 34a and 34b respectively. According to this configuration of the lens holder 24a, an effective lens actuator is constructed having the capability of moving the objective lens O in a focus direction.

A triangular protrusion 44k is formed on the surface of the coil holder 44b and can engage with a stopper member 40. The stopper member 40 has a first arm 40a and second arm 40b. A rotating bearing 40j is installed between the first arm 40a and second arm 40b. The stopper member 40 is supported above the yoke 32b to enable rotation. A spring member 41, which can be a leaf spring or wound coil spring, is installed onto the yoke 32b, and is used to press a side surface of the second arm 40b against a stop protrusion 42c. The spring member 41 applies an elastic force and securely engages protrusions 42b and 42c which are located on a wall of the storage portion 21a. According to the present invention, the second arm 40b is capable of returning to an unlocked position from a locked position. In a preferred embodiment, the spring member 41, or a second spring member, may also be constructed to apply an elastic force against the first arm 40a.

An end of the second arm 40b also includes a balance member 40c embedded into the second arm 40b. The balance member 40c is preferably a lead weight, or other suitable material known in the art, and is adhesively secured to the second arm 40b. Additionally, the balance member 40c is preferably configured to accommodate a type of material used for the second arm 40b. The balance member 40c may also be constructed to perform the same function as a weight. This balance member 40c effectively assists in setting the stopper member 40 to on/off positions.

Figure 3A:
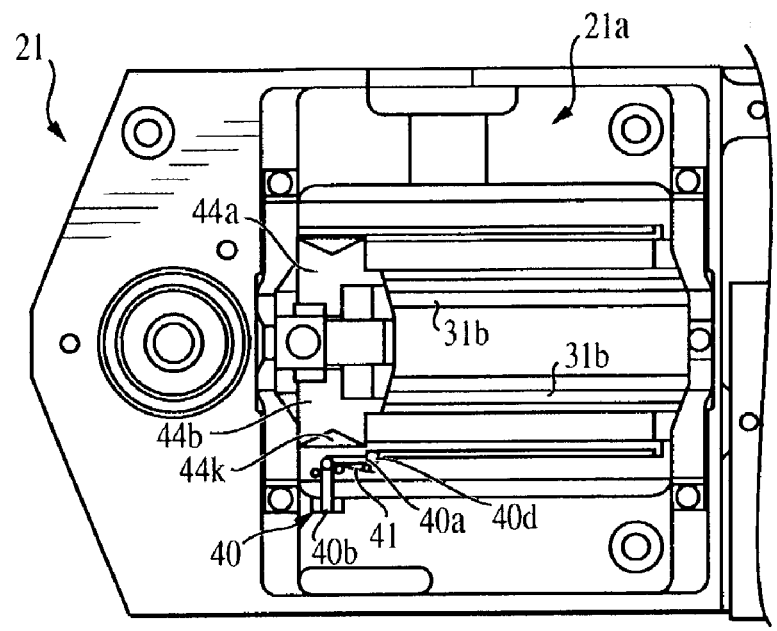
FIG. 3a is a top view of the base assembly in the unlocked state.
Figure 3B:
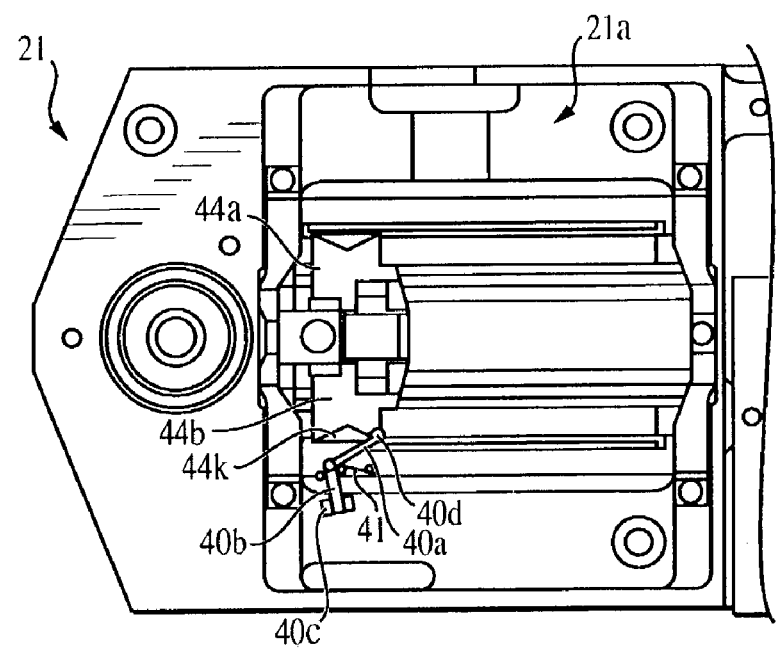
FIG. 3b is a top view of the base assembly in the locked state.
Figure 4A:
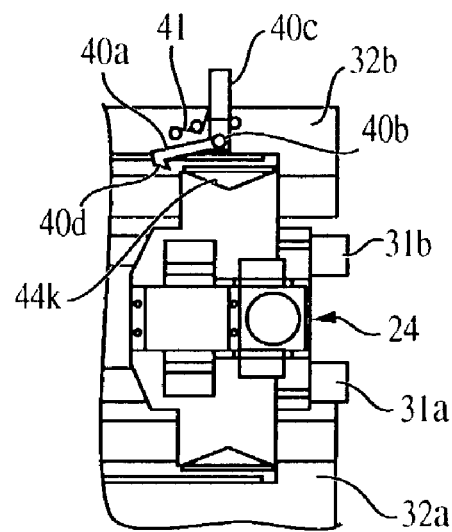
FIGS. 4a and 4b are diagrams that illustrate the principle behind one embodiment of the present invention.
Figure 4B:
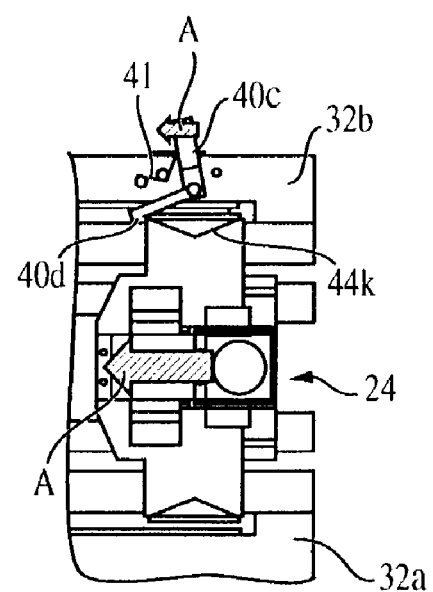

FIGS. 3a and 3b are expanded top views of the base assembly 14, and FIGS. 4a and 4b are partial expanded top views of the carriage 24. FIGS. 3a and 4a illustrate the unlocked state of the stopper member 40, as well as its underlying principle. FIGS. 3b and 4b illustrate the locked state of the stopper member 40 as well as its underlying principle. Because FIGS. 3a and 4a show a situation in which no shock force to the device 1 has been received (due to the device being dropped, shaken, etc.), the second arm 40b is shown being supported in the unlocked position as it receives an elastic force from the spring return member 41.

An engagement hook 40d of the first arm is constructed as a single unit so that the first arm 40a is preferably linked to the second arm 40b, and thus can be held in a position in which the hook 40d does not become a hindrance to the carriage 24 when in the unlocked position. However, as shown in FIGS. 3b and 4b, when a shock is received in the A direction (direction of disturbance acceleration), operation of the balance member 40c causes the second arm 40b to rotate to the locked position from the unlocked position. The nearly vertical position of the second arm 40b, with respect to the movable direction of the carriage 24 (transverse direction with respect to the tracks of disk 10) is thus set to the unlocked position. Therefore, a shock force that causes the carriage 24 to then move when an external force is working in the moveable direction, may be easily converted to a rotational force for the second arm 40b.

In the case when a specified direction component receives a shock force that is greater than the return force of the spring return member 41, the second arm 40b moves against the return force of the return member 41 and starts to rotate, which in turn causes a shift to the locked position. Then, when both the first arm 40a and second arm 40b rotate, the V-shaped hook 40d on the end of the first arm engages the carriage protrusion 44k. Therefore, when a shock force is received, the stopper member 40 catches the moving carriage 24, thereby preventing the carriage 24 from shifting in the A direction.

Figure 5A:
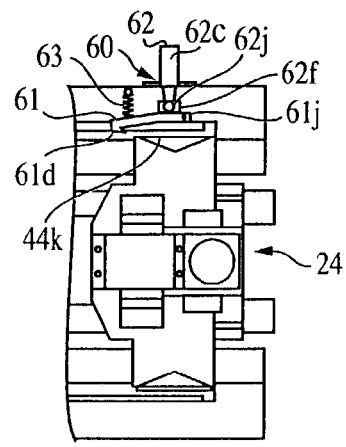
FIGS. 5a, 5b, and 5c are diagrams that illustrate the principle behind a second embodiment of this invention.
Figure 5B:
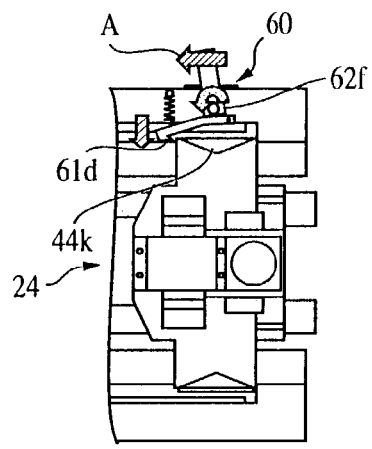
Figure 5C:
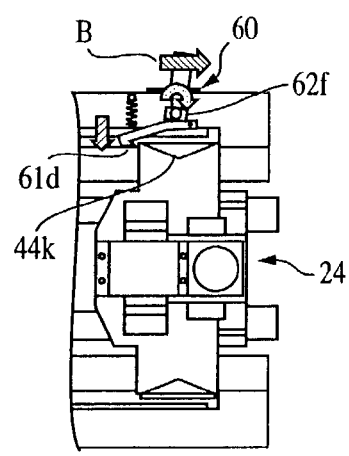

Referring now to FIGS. 5a–5c, FIG. 5a illustrates the unlocked state of the stopper member 40 as well as its underlying principle, and FIG. 5b illustrates the locked state of the stopper member 40 as well as its underlying principle. In contrast to FIGS. 4a and 4b, this embodiment shows how the device may lock in response to a shock force received from two different directions.

According to this embodiment, a first arm 61 and a second arm 62 of the stopper member 60 are installed separately so that each can rotate independently on top of the yoke 32b. One end of the first arm 61 has a V-shaped engagement hook 61d, and the other end includes a rotational axis 61j. One end of the second arm 62 includes a balance member 62c, and the other end includes a rotating axis 62j and an operation arm 62f. A spring member (leaf spring, wound coil spring, or the like) 63 is installed onto the magnetic circuit yoke 32b, and also functions as a return member to return the first arm 61 from the locked position to the unlocked position. The balance member 62c is embedded into the second arm 62, and is preferably a lead weight, secured using an adhesive. Additionally, the balance member 62c is preferably configured to account for the type of material used for the second arm 62b. The balance member 62c may also be constructed to perform the same function as a weight.

As shown in FIG. 5a, an operating area of the operation arm 62f extends generally parallel to an operating area of the first arm 61. In cases where the operation arm 62f and the first arm 61 become engaged together, when in the unlocked position, the operational arm 62f and the first arm 61 may be relatively positioned to provide some interference space between the two arms.

FIG. 5b shows the locked state of the stopper member 60. The second arm 62 rotates toward the A direction about the rotational axis 62j (FIG. 5a) in response to a shock received from the opposite direction. An end of the arm 62f presses the first arm 61 to rotate toward the carriage 24 about rotational axis 61j, thus enabling the V-shaped hook 61d on the end of the first arm 61 to engage with the engagement member (protrusion) 44k on the carriage.

According to this configuration, when a shock force is received opposite to the A direction, the stopper member 60 catches the moving carriage 24, thereby preventing the carriage 24 from shifting in the A direction. After the shock force subsides, the first arm 61 moves from the locked position to the unlocked position through the pulling force of the spring member 63. The second arm 62 is pushed by the first arm 61 and is thus moved from the locked position to the unlocked position.

FIG. 5c also shows the locked state of the stopper member 60. The second arm 62 rotates toward the B direction about the rotational axis 62j in response to a shock received opposite to the B direction. An opposite end of the operation arm 62f presses the first arm 61 so that the first arm 61 rotates down toward the carriage 24 about rotational axis 61j. Thus, the V-shaped hook 61d on the end of the first arm 61 engages the engagement member (protrusion) 44k on the carriage.

According to this configuration, when a shock force is received in a direction opposite to the B direction, the stopper member 60 catches the moving carriage 24, thereby preventing the carriage from shifting in the B direction. After the shock force subsides, the first arm 61 moves from the locked position to the unlocked position through the pulling force of the spring member 63. The second arm 62 is pushed by the first arm 61, and is thus moved from the locked position to the unlocked position.

In the two preceding embodiments for stopper members, as shown in FIGS. 4a and 5a, the function of the stopper members is to prevent movement of the carriage in the A direction only with respect to the shock received while the power is off. In these embodiments, the carriage 24 first moves to the home position on the end of an inner circumference side of the disk 10 (the turntable side of the spindle motor). Furthermore, it is capable to set the home position to the end of the moveable area belonging to the carriage 24 on outer circumference side of the disk 10 (disk insertion side). This movement to the home position is preferably conducted during final processing when the power is turned off. Furthermore, in order to assure that the carriage 24 also moves to the home position when power is turned off due to unusual circumstances (such as a power failure), it is preferable to attach a mechanism that allows electricity to be delivered from a source other than the main power source (a battery, or the counter-electromotive force of the spindle motor 22, etc.).

In cases where the stroke movement in the B direction is either zero or a low amount, the opposing shock force would also be low. In such cases, there is then little need for concern, and the stopper member then would only need to function in cases where a movement occurs in the A direction from the home position.

In another embodiment of the present invention, it is possible to use both the stopper member 40 (shown in FIG. 4a) and the stopper member 60 (shown in FIG. 5a) together, such that one is installed on a side of the yoke 32a, and the other to a side of the yoke 32b, so that the two different stopper members 40 and 60 oppose one another. In such a case, the respective engagement hooks would face in opposing directions, thus making it possible to simultaneously prevent movement in both the A and B directions.

The foregoing examples illustrate embodiments in which the stopper member is located on the yoke 32a or 32b. However, according to a further embodiment of the present invention, the stopper member may also be effectively located on an inner wall of the storage portion 21a of the head base assembly 14, or on the load base 26 of the load/eject assembly 15. The installation position of the stopper member may also be modified to take into consideration the amount of space available.

In an even further embodiment of the present invention, the spring member that is used as the return member may be adjusted so that the return force is applied to the first arm instead of the second arm.

Figure 6A:
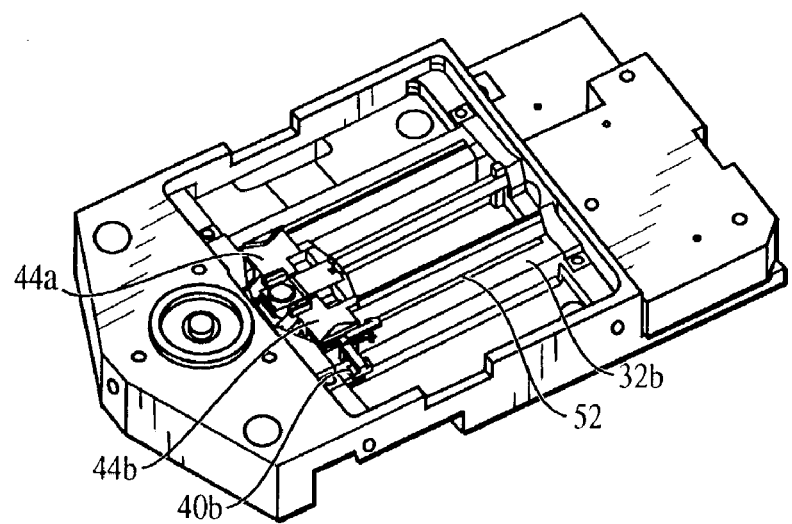
FIG. 6a is a perspective view of the base assembly with a magnet as the return member.
Figure 6B:
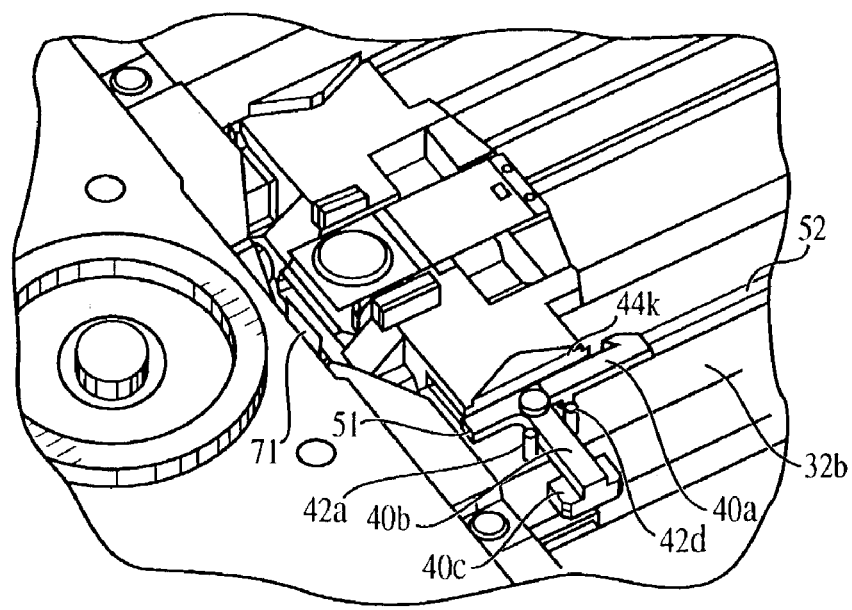

FIGS. 6a and 6b illustrate examples of another embodiment of the return member. In the foregoing embodiments, the return member was constructed of a spring member. In the following embodiments, however, a magnetic pulling force is used as the return force.

A magnetic material 51, preferably made from steel plate, is located below the first arm 40a on a surface facing a magnet 52. In this embodiment, the magnet 52 used is preferably the same as the one used for the previously-described magnetic circuit. However, a separate magnet can also be installed onto the yoke 32. Furthermore, a magnet may also be provided on the first arm 40a, in which case heteropolarity is created with respect to the magnet 52, which in turn results in an increase in the attraction force with respect to the magnet 52.

In another embodiment, a magnetic material or magnet is provided on the second arm 40b, and another magnet or magnetic surface is provided on a surface facing the magnetic material or first magnet. A weight used for the balance member 40c may also be constructed of a magnetic material or magnet. According to this embodiment, first arm 40a is able to return from the locked position to the unlocked position after a shock to the device 1 subsides. In this embodiment, the return member for the stopper member 60 may also be made from the same type of magnetic material or magnet.

Figure 7:
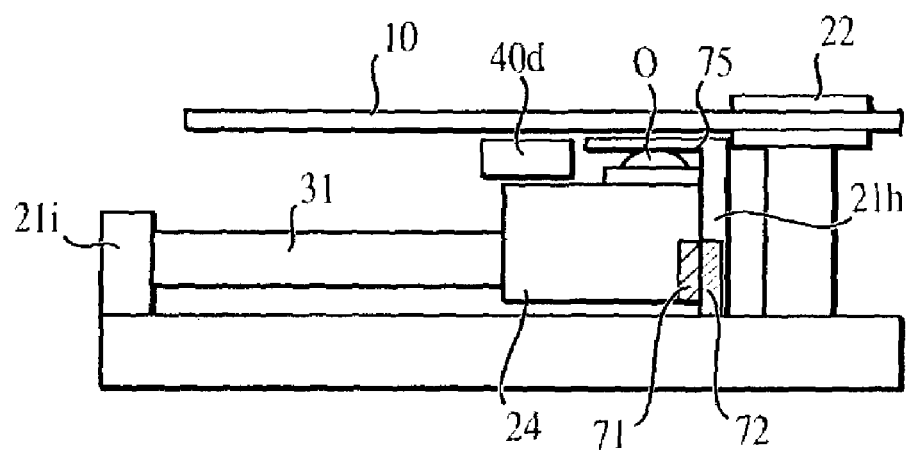
FIG. 7 is a side view of the home position area, according to one embodiment of the present invention.

FIG. 7 illustrates a setup to provide a securing mechanism for the purpose of securing the carriage 24 in the home position. Although movement of the carriage 24 to the home position is normally conducted during final processing when the power is turned off, this movement cannot occur when the power is turned off due to unusual circumstances (such as a power failure, etc.). It is capable to set the home position to the end of the moveable area belonging to the carriage 24 on an outer circumference side of the disk 10 (disk insertion side). Furthermore, in order to assure that the carriage 24 moves to the home position when power is turned off due to such unusual circumstances, it is preferable to attach a mechanism that allows electricity to be delivered from a source other than the main power source.

However, in such a configuration, it is also preferable to provide a countermeasure for the sake of obtaining a better level of safety for the carriage 24. Accordingly, once the carriage 24 has been moved to the home position, the carriage 24 is securely held in place at the home position. A magnetic material 71 is provided on the carriage, and a magnet 72 is provided on a wall 21h of an end of the moveable area of the carriage 24. Alternatively, a magnet may instead be provided on the carriage 24, and a magnetic material or another magnet may be provided on the wall 21h of the end of the moveable area of the carriage. In this embodiment, the carriage 24 can thus be latched onto the head base 21 and held in the home position, thereby enabling the stopper member to accurately function when a shock occurs.

Since the holding force in the foregoing embodiment is typically less than the drive force generated by the voice coil motor of the carriage 24, it is possible for a movement from the home position to occur using the drive force from the voice coil motor of the carriage 24 after power to the device 1 is turned on. At this level of holding force, a level of acceleration is achieved which is less than the shock acceleration that makes it possible to secure the carriage. Therefore, by balancing the return force and the weight used for the balance member to enable the first arm 40a to move to the locked position, adequate protection against any level of shock acceleration may be realized.

In this embodiment, when the drive is simply placed in a vertical orientation, the stopper member does not operate. In order to hold the carriage 24 in the home position then, the following settings are made: Acceleration Capable of Being Generated by Voice Coil Motor>Magnetic Force Holding Acceleration>Lock Operation Acceleration approximately 9.8 m/s² (normal gravitational acceleration of 1G).

Additionally, an objective lens protection cover mechanism 75 can be applied to protect the objective lens O from contact with the disk 10 when in the home position. Moreover, since no tracks are generally formed on the innermost and outermost portions of the disk 10, and since no recording/playback would therefore take place at these locations, there is no need for focus control to be conducted to bring the objective lens O near the disk 10 when in the home position. Accordingly, by setting the home position within the moveable area that is outside the recording/playback range of the disk 10, the lens protection mechanism 75 may be conveniently installed. The lens protection mechanism 75 is preferably set in a position to face the objective lens O, and constructed of a flexible material, such as rubber, to help alleviate shock caused by vibrations of the objective lens O.

Figure 8:
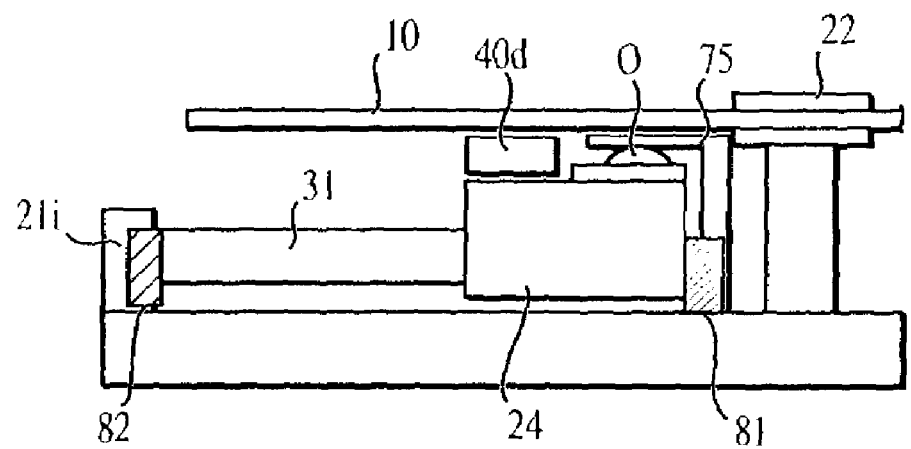
FIG. 8 is a side view of the home position area, according to another embodiment of the present invention.

FIG. 8 illustrates a cross sectional view different from that illustrated in FIG. 7. In this embodiment, shock absorption members 81 and 82 are provided to help alleviate shock, and are located on the carriage 24 and a wall 21i of the head base 21, respectively. The shock absorption member 81 is preferably constructed of a flexible rubber material or low-impact substance and is attached to a wall on the outside of the carriage 24. The shock absorption member 82 is also preferably constructed of a flexible rubber material or low-impact substance and is attached to the wall 21i of the storage portion 21a on a surface facing the carriage 24 near the guide rail 31. According to this embodiment, even in cases where the stopper member does not function well and the carriage 24 strikes against a wall at either end of its moveable area, it is possible for the shock to be absorbed to prevent damage to the carriage 24.

As explained above, the present invention is configured to instantly lock a head carriage into position when a shock occurs to a memory device, regardless of whether or not a memory medium is loaded in the device, in order to prevent movement of the head carriage.

Additionally, the present invention allows for an advantageously simple and compact construction, and is capable of rapidly responding to shock by locking the head carriage into position, while also being capable of preventing damage to the carriage and lens actuator. Furthermore, because the present invention is capable of utilizing existing open space within a device, it is suitable for use in compact devices.

Even though the aforementioned embodiments were described separately, it is within the ability of one skilled in the art to provide more than one embodiment, or to combine embodiments, within the same magneto optical device.

Furthermore, even though the aforementioned embodiments were described in relation to their use in an optical disk device, it is also within the ability of one skilled in the art to apply the various embodiments of the present invention to other types of memory devices, such as magnetic disk devices, or card devices containing linear actuators, or even to devices other than memory devices, such as head devices, or optical devices that use linear actuators. It will also be appreciated by those skilled in the art that changes and modifications can be made to the described invention without departing from the invention in its broader aspects, and as set forth in the following claims.

What is claimed is:

1. A memory device for at least one of recording, playback, and erasure of data through the application of an optical head along a memory medium, comprising:
   a head carnage which moves the optical head along a surface of the memory medium;
   a carriage lock which is used to prevent movement of said head carriage in response to a specific shock force, said carriage lock utilizing mechanical energy received from said shock force to prevent said movement; and
   a return member that exerts a biasing force on said carriage lock to automatically return said carriage lock to an unlocked position from a locked position after said shock force subsides and to hold said carriage lock in said unlocked position when no shock force exists, said unlocked position locating said carriage lock entirely outside of a path of movement of said head carriage;
   wherein said carriage lock is constructed to be able to move between said locked and unlocked positions in direct conjunction with said mechanical energy from said shock force, and
   wherein a locking force that directly moves said carriage lock into said locked position is greater than said biasing force that holds and returns said carriage lock to said unlocked position.

2. The memory device of claim 1, wherein
   said carriage lock is constructed to be able to rotate between locked and unlocked positions, and
   said shock force causes said carriage lock to rotate from said unlocked position to said locked position.

3. The memory device of claim 2, further comprising:
a first arm having an engagement mechanism which engages said carriage lock with said head carriage when in said locked position;
a second arm linked to said first arm, said second arm moving said first arm between said locked and unlocked positions; and
a balance member attached to said second arm, said balance member assisting said second arm to achieve a rotational force when said shock force is received.

4. The memory device of claim 2, further comprising:
a first arm having an engagement mechanism which engages said carriage lock with said head carriage when in said locked position;
a second arm operating said first arm by moving said first arm between said locked and unlocked positions; and
a balance member attached to said second arm, said balance member assisting said second arm to achieve a rotational force when said shock force is received.

5. The memory device of claims 3 or 4, wherein said return member is constructed of a spring member which forces said first or second arm in an unlocked direction.

6. The memory device of claims 3 or 4, wherein said balance member is a weight which provides a balance such that said carnage lock enters said locked position when said shock force causes said balance member to move at an acceleration which measures approximately 9.8 m/s$^2$ or greater relative to the memory device.

7. The memory device of claims 3 or 4, wherein said head carriage is supported by two guide rails and contains a coil support which supports a drive coil, such that said head carriage may be prevented from shifting when said engagement mechanism makes direct contact with said coil support.

8. The memory device of claim 1, wherein an end of a movable area of said head carriage includes a protective cover which protects the optical head.

9. The memory device of claim 8, wherein said protective cover protects the optical head when the optical head is positioned outside a recording/playback range of the memory medium.

10. The memory device of claim 8, wherein said protective cover is made from a flexible material.

11. The memory device of claim 8, wherein said protective cover faces the optical head.

12. The memory device of claim 1, wherein said head carriage, or an end of a movable area of said head carriage, includes a shock absorbing member which serves to alleviate a mechanical shock to said head carriage.

13. The memory device of claim 1, wherein said head carriage includes a magnet or magnetic material which supports said head carriage at an end of a movable area of said head carriage.

* * * * *